(12) United States Patent
Sakata

(10) Patent No.: US 7,559,013 B2
(45) Date of Patent: Jul. 7, 2009

(54) ERROR DETECTING DEVICE, ERROR DETECTION METHOD AND CONTROL SYSTEM

(75) Inventor: Katsumi Sakata, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 535 days.

(21) Appl. No.: 11/331,123

(22) Filed: Jan. 13, 2006

(65) Prior Publication Data

US 2006/0157552 A1    Jul. 20, 2006

(30) Foreign Application Priority Data

Jan. 17, 2005    (JP)    ............................. 2005/008763

(51) Int. Cl.
  G06F 7/02   (2006.01)
  H03M 13/00  (2006.01)
(52) U.S. Cl. ..................................... 714/819
(58) Field of Classification Search .................. 714/25, 714/48, 46, 799, 819

See application file for complete search history.

(56) References Cited

U.S. PATENT DOCUMENTS 4,916,696 A * 4/1990 Funakubo .................... 714/11

FOREIGN PATENT DOCUMENTS

JP    2004-013196    1/2004

* cited by examiner

*Primary Examiner*—Shelly A Chase
(74) *Attorney, Agent, or Firm*—Wenderoth, Lind & Ponack, L.L.P.

(57) ABSTRACT

An error detecting device enables proper detection of an occurrence of a data error in a register. The error detecting device for detecting an occurrence of a data error in a register for holding input data with reception of a write permission comprises an operation circuit for performing a prescribed operation with each data output from a plurality of registers, a comparison register for storing data for comparison, a write unit for writing data obtained through the operation in the operation circuit into the comparison register in accordance with the timing of write permission by the write permission signal and a comparator for comparing the data for comparison stored in the comparison register with the data obtained through the operation in the operation circuit so as to detect garbled data in the registers.

11 Claims, 6 Drawing Sheets

ERROR DETECTING DEVICE, ERROR DETECTION METHOD AND CONTROL SYSTEM

BACKGROUND OF THE INVENTION

1. Field of the Invention

The present invention relates to an error detecting device, an error detection method and a control system and, more particularly, to an error detecting device, an error detection method and a control system for detecting an occurrence of a data error (garbled data) in a register which temporarily stores data to be calculated or a calculated result.

2. Description of the Relevant Art

Garbled data is sometimes caused in a register by a power failure or noise. If the processing is continued as usual in spite of the occurrence of garbled data in the register, there is a possibility that the electronic equipment itself may be damaged. Therefore, it is extremely important to detect the occurrence of garbled data in the register.

For that reason, hitherto, various kinds of methods for detecting garbled data in a register have been proposed (e.g. see the below-mentioned Patent Document 1). FIG. 6 is a block diagram schematically showing the principal part of a conventional error detecting device for detecting garbled data in a register. The conventional error detecting device comprises a state hold register 1 for holding input data, an inverter circuit (NOT circuit) 2 for inverting and outputting the input data, a reference register 3 for holding the data from the inverter circuit 2, an inverter circuit 4 for inverting and outputting the data from the state hold register 1, an NAND circuit 5 for receiving the data from the inverter circuit 4 and the data from the reference register 3, and operating and outputting a 'negated AND', and an EX-OR circuit 6 for receiving the data from the inverter circuit 4 and the data from the reference register 3, and operating and outputting an 'exclusive-OR' (that is, deciding the correctness of the data held in the state hold register 1 and outputting an error flag).

A data control signal is a signal for permitting to write data into the state hold register 1 and the reference register 3. The state hold register 1 holds the input data when receiving the data control signal which permits the writing of data. The reference register 3 holds the data from the inverter circuit 2 (the inverted data of the input data) when receiving the data control signal.

A detecting operation of an occurrence of a data error performed with a data holding operation in this error detecting device is described below. First, a case of no occurrence of a data error is described. When an input signal data into the state hold register 1 is '0', and the state hold register 1 and the reference register 3 receive a data control signal of '1', the state hold register 1 holds the data '0' and the reference register 3 holds the data '1'.

In this situation, the data '1' from the inverter circuit 4 and the data '1' from the reference register 3 are output to the NAND circuit 5 and the EX-OR circuit 6. Accordingly, the data '0' (the same as the data held in the state hold register 1) is output from the NAND circuit 5, while the data '0' is output from the EX-OR circuit 6 as an error flag. When a data error occurs, the error flag turns '1'.

Next, a case of an occurrence of a data error is described. When the data held in the state hold register 1 is transformed from '0' to '1' due to an instantaneous power interruption and the like, the data '0' from the inverter circuit 4 and the data '1' from the reference register 3 are output to the EX-OR circuit 6, leading to outputting of the data '1' from the EX-OR circuit 6 as an error flag. Thus, the occurrence of a data error can be detected.

However, in this conventional error detecting device, in order to detect an occurrence of a data error in one register (state hold register 1), another register (reference register 3) is required, that is, a double-register construction is needed, resulting in a great increase in cost. In addition, when the scale of a digital circuit is huge, the double-register construction is extremely difficult to realize with consideration of arrangement space and the like.

[Patent Document 1] Japanese Patent Application Laid-Open No. 2004-13196

SUMMARY OF THE INVENTION

The present invention was accomplished in order to solve the above problem, and it is an object of the present invention to provide an error detecting device, an error detection method and a control system, whereby an occurrence of a data error in a register can be appropriately detected without double-register construction.

In order to achieve the above object, an error detecting device according to a first aspect of the present invention is characterized by an error detecting device for detecting an occurrence of a data error in a register for holding input data with reception of a write permission, the error detecting device comprising an operation unit for performing a prescribed operation with each data output from a plurality of registers to be examined, a memory for storing data for comparison, a write unit for writing data obtained by the operation unit into the memory in accordance with the timing of the write permission, and a comparison unit for comparing the data for comparison stored in the memory with the data obtained by the operation unit.

When the error detecting device according to the first aspect of the present invention is used, the prescribed operation (e.g. an operation for finding the sum of all data) is performed with each data output from the plurality of registers to be examined, and data obtained through this operation is written into the memory as the data for comparison in accordance with the timing of the write permission. And the data for comparison stored in the memory and the data obtained by the operation unit (the prescribed operation) are compared with each other.

It is natural that the data to be obtained through the prescribed operation should be influenced and be changed by a change of the data to be output from the registers (that is, the data to be held in the registers).

In a normal operating condition, the data to be held in the registers changes only in a case where the registers received the write permission. Accordingly, in a normal operating condition, the data to be obtained through the prescribed operation also changes only in a case where the registers received the write permission.

The writing of the data obtained through the prescribed operation into the memory is conducted in accordance with the timing of the write permission. That is, the writing of the data obtained through the prescribed operation into the memory is conducted, as described below, when the registers receive the write permission, the data to be held in the registers changes, and as a result of being influenced by the change, the data to be obtained through the prescribed operation changes.

When the registers receive the write permission:
 the data to be held in the registers (the data to be output from the registers) changes;

the data to be obtained through the prescribed operation is influenced by the change and is changed; and then, the data obtained through the prescribed operation is written into the memory as the data for comparison.

Thus, during normal operation of the registers, the latest data to be obtained through the prescribed operation is always stored in the memory. Therefore, during normal operation of the registers, the data stored in the memory (the data for comparison) and the data to be obtained through the prescribed operation are always the same.

On the other hand, when the data to be held in the registers is changed by a power failure or noise (garbled data), and the data to be obtained through the prescribed operation is influenced by the change and is changed, the data to be stored in the memory is not updated. That is because the garbled data has nothing to do with the write permission. Therefore, when the data to be held in the registers is changed by a power failure or noise, a difference is caused between the data (the data for comparison) stored in the memory and the data to be obtained through the prescribed operation.

Thus, during normal operation of the registers, the data (the data for comparison) stored in the memory and the data to be obtained through the prescribed operation are the same. However, when the data to be held in the registers is changed by a power failure or noise, a difference is caused between the data (the data for comparison) stored in the memory and the data to be obtained through the prescribed operation. Therefore, by comparing the data for comparison with the data obtained by the operation unit, an occurrence of a data error in the registers can be detected.

An error detecting device according to a second aspect of the present invention is characterized by the operation unit which performs a logical operation in the error detecting device according to the first aspect of the present invention.

When the error detecting device according to the second aspect of the present invention is used, a logical operation is performed in the operation unit, and so values to be obtained through the prescribed operation are limited to two values of '1' and '0'. As a result, the operation unit can be made of a comparatively simple circuit. Here, as the logical operation, AND, OR and EX-OR are exemplified.

An error detecting device according to a third aspect of the present invention is characterized by the operation unit which performs an arithmetic operation in the error detecting device according to the first or second aspect of the present invention.

As described above, when the prescribed operation is limited to a logical operation, values to be obtained through the prescribed operation are limited to two values of '1' and '0'. Therefore, even if a data error occurs, for example, there is a possibility that the occurrence of the data error may not be reflected on a result to be obtained through the prescribed operation, resulting in failure to detect the data error.

When the error detecting device according to the third aspect of the present invention is used, an arithmetic operation (e.g. addition, subscription, multiplication and division) is performed, and so values to be obtained through the prescribed operation are not limited to the two values of '1' and '0'. As a result, the occurrence of a data error can be more properly detected. Here, the prescribed operation can be not only addition, subscription, multiplication and division, but also a combination with a logical operation. Or in the case of division, not quotient but remainder can be used in the operation.

An error detecting device according to a fourth aspect of the present invention is characterized by the write unit which writes the data obtained by the operation unit into the memory with a predetermined time delay after the timing of the write permission in any of the error detecting devices according to the first to third aspects of the present invention.

When the data obtained by the operation unit is written into the memory at the same time as the timing of the write permission, that is, without any delay after the timing, there is a possibility that not the updated resulting data but the resulting data not yet updated may be written into the memory.

When the error detecting device according to the fourth aspect of the present invention is used, the data obtained by the operation unit is written into the memory not at the same time as the timing of the write permission but with a predetermined time delay (e.g. 1 clock delay) after the timing. Thus, it is possible to prevent the writing of resulting data not yet updated into the memory.

An error detecting device according to a fifth aspect of the present invention is characterized by the registers which are scattered on an integrated circuit in any of the error detecting devices according to the first to fourth aspects of the present invention.

When the error detecting device according to the fifth aspect of the present invention is used, an occurrence of a data error caused by a power failure or noise can be detected across the integrated circuit since the registers are scattered on the integrated circuit (such as an LSI). Here, if the registers are evenly spaced across the integrated circuit, the occurrence of a data error can be detected more properly.

An error detecting device according to a sixth aspect of the present invention is characterized by further comprising a plurality of memories, wherein the data obtained by the operation unit is written into every memory in any of the error detecting devices according to the first to fifth aspects of the present invention.

In the error detecting device according to the first aspect of the present invention, the writing of the data obtained through the prescribed operation into the memory is conducted in accordance with the timing of the write permission. Therefore, wrong data is not written into the memory.

However, when a data error is caused by a power failure or noise at about the same time as the normal timing of writing, there is a possibility that wrong data may be written into the memory and that the occurrence of the data error may not be detected.

When the error detecting device according to the sixth aspect of the present invention is used, a plurality of memories are arranged, and the data obtained by the operation unit is written into each of the memories. As a result, even if wrong data was written into any one of the memories, the memory/memories into which correct data was written exists/exist, leading to detection of the occurrence of a data error.

An error detecting device according to a seventh aspect of the present invention is characterized by a plurality of memories and the registers to be examined which are divided into groups, further comprising the operation unit arranged in every group, wherein data obtained by each operation unit is separately written into each memory in any of the error detecting devices according to the first to fourth aspects of the present invention.

When the error detecting device according to the seventh aspect of the present invention is used, a plurality of memories are arranged, and the data obtained by the operation unit is written into each of the memories. As a result, even if wrong data was written into any one of the memories, the memory/memories into which correct data was written exists/exist, leading to detection of the occurrence of a data error.

Furthermore, the registers to be examined are divided into groups, the operation unit is arranged in each of the groups, and data obtained by each of the operation units is written into each of the memories, respectively. As a result, the number of the registers to be dealt with by one of the operation units can be reduced, leading to a simple circuit configuration or simple interconnections.

An error detecting device according to an eighth aspect of the present invention is characterized by the registers which are scattered on an integrated circuit and are divided into groups based on their locations in the error detecting device according to the seventh aspect of the present invention.

When the error detecting device according to the eighth aspect of the present invention is used, an occurrence of a data error caused by a power failure or noise can be detected across the integrated circuit since the registers are scattered on the integrated circuit (such as an LSI). In addition, since the registers are divided into groups based on their locations (closer registers are grouped), the length of interconnections which are required for realizing the prescribed operation can be shortened, leading to a simple circuit configuration. Here, when the registers are evenly spaced across the integrated circuit, the occurrence of a data error can be detected more properly.

An error detection method according to a first aspect of the present invention is characterized by an error detection method for detecting an occurrence of a data error in a register for holding input data with reception of a write permission, the error detection method comprising a step of performing a prescribed operation with each data output from a plurality of registers to be examined, a step of writing data obtained through the operation into a memory for storing data for comparison in accordance with the timing of the write permission, and a step of comparing the data for comparison stored in the memory with the data obtained through the operation.

In the error detection method according to the first aspect of the present invention, the prescribed operation (e.g. an operation for finding the sum of all data) is performed with each data output from the plurality of registers to be examined, and the data obtained through the operation is written into the memory as the data for comparison in accordance with the timing of the write permission. And the data for comparison stored in the memory and the data obtained by the operation unit (the prescribed operation) are compared with each other.

During normal operation of the registers, the data (the data for comparison) stored in the memory and the data to be obtained through the prescribed operation are the same. However, when the data to be held in the registers is changed by a power failure or noise, a difference is caused between the data (the data for comparison) stored in the memory and the data to be obtained through the prescribed operation. Therefore, by comparing the data for comparison with the data obtained by the operation unit, the occurrence of a data error in the registers can be detected.

A control system according to a first aspect of the present invention is characterized by a control system in which any of the error detecting devices according to the first to eighth aspects of the present invention is adopted, comprising a plurality of registers for holding data obtained from a millimeter wave radar, a control unit for conducting control based on the data held in the registers, an operation unit for performing a prescribed operation with each data output from the plurality of registers, a memory for storing data for comparison, a write unit for writing data obtained by the operation unit into the memory in accordance with the timing of the write permission and a comparison unit for comparing the data for comparison stored in the memory with the data obtained by the operation unit.

A control system according to a second aspect of the present invention is characterized by a control system in which the error detection method according to the first aspect of the present invention is adopted, comprising a plurality of registers for holding data obtained from a millimeter wave radar, a control unit for conducting control based on the data held in the registers, an operation unit for performing a prescribed operation with each data output from the plurality of registers, a memory for storing data for comparison, a write unit for writing the data obtained by the operation unit into the memory in accordance with the timing of the write permission and a comparison unit for comparing the data for comparison stored in the memory with the data obtained by the operation unit.

As a system in which data obtained from a millimeter wave radar is used, an adaptive cruise control system for keeping a distance from a vehicle ahead is exemplified. The adaptive cruise control system is effective for avoiding a collision with a vehicle ahead. In order to avoid a collision properly, the use of data including no garbled data is extremely important. In other words, with the use of data including an error, a high degree of accuracy in control on a distance between cars cannot be expected.

In the control system according to the first or second aspect of the present invention, it is possible to detect an occurrence of a data error in the register which holds data obtained from the millimeter wave radar. Thus, even if the data obtained from the millimeter wave radar is used, it is possible to properly conduct control with high accuracy.

DESCRIPTION OF THE PREFERRED EMBODIMENTS

Figure 1:
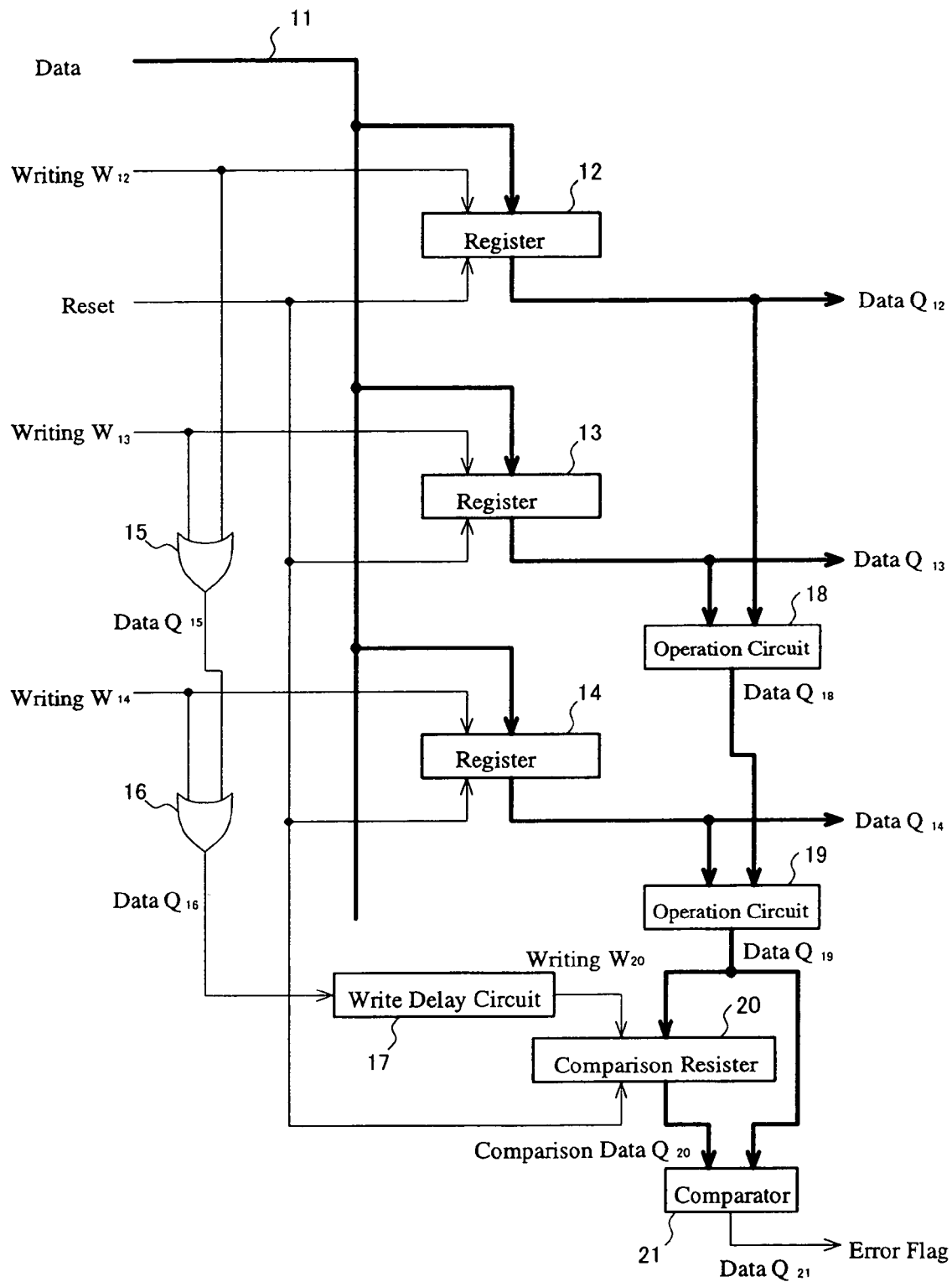
FIG. 1 is a block diagram schematically showing the principal part of an error detecting device according to a first embodiment of the present invention.

The preferred embodiments of the error detecting device and the error detection method according to the present invention are described below by reference to the Figures noted above. FIG. 1 is a block diagram schematically showing the principal part of an error detecting device according to a first embodiment (or a device in which an error detection method according to the first embodiment is adopted). Reference numeral 11 in FIG. 1 represents a data bus, to which registers 12-14 to be examined are connected. To the registers 12-14, write permission signals $W_{12}$-$W_{14}$ for permitting the writing of data on the data bus 11 are input, respectively. When the write permission signal $W_{12}$ turns a high level of '1', the data on the data bus 11 is held in the register 12. Similarly, when the write permission signal $W_{13}$ or $W_{14}$ turns a high level of '1', the data on the data bus 11 is held in the register 13 or 14.

The write permission signals $W_{12}$ and $W_{13}$ are output to an OR circuit 15 for operating and outputting an 'OR'. Resulting data $Q_{15}$ in the OR circuit 15 and the write permission signal $W_{14}$ are output to an OR circuit 16 for operating and outputting an 'OR'. Resulting data $Q_{16}$ in the OR circuit 16 is output to a write delay circuit 17. Accordingly, when at least one of the write permission signals $W_{12}$-$W_{14}$ is a high level of '1', a signal of high-level '1' is input to the write delay circuit 17. If at least one of the input signals to the OR circuit 15 or 16 becomes a high level of '1', the output signal therefrom becomes a high level of '1'.

The registers 12-14 output data $Q_{12}$-$Q_{14}$ held therein to the outside. The data $Q_{12}$ output from the register 12 and the data $Q_{13}$ output from the register 13 are output to an operation circuit 18. Resulting data $Q_{18}$ in the operation circuit 18 and the data $Q_{14}$ output from the register 14 are output to an operation circuit 19. Resulting data $Q_{19}$ in the operation circuit 19 is output to both a comparison register 20 for holding comparison data and a comparator 21.

As the operation circuits 18 and 19, logical operation circuits such as an AND circuit, an OR circuit and an EX-OR circuit, and arithmetic operation circuits such as an addition (ADD) circuit, a subscription (SUB) circuit, a multiplication (MUL) circuit and a division (DIV) circuit can be adopted.

To the comparison register 20, a write permission signal $W_{20}$ for permitting the writing of the resulting data $Q_{19}$ output from the operation circuit 19 is input from the write delay circuit 17. When the write permission signal $W_{20}$ turns a high level of '1', the resulting data $Q_{19}$ is held in the comparison register 20. And from the comparison register 20, comparison data $Q_{20}$ held therein is output to the comparator 21.

After receiving a signal of high-level '1' from the OR circuit 16, the write delay circuit 17 outputs the write permission signal $W_{20}$ of high-level '1' to the comparison register 20 with one clock delay. As described above, when at least one of the write permission signals $W_{12}$-$W_{14}$ is a high level of '1', a signal of high-level '1' is input to the write delay circuit 17.

Accordingly, when data is written into one of the registers 12-14 (i.e. the resulting data $Q_{19}$ to be obtained through the operations in the operation circuits 18 and 19 changes), a signal of high-level '1' is output to the comparison register 20 and the updated resulting data $Q_{19}$ is held in the comparison register 20 as the comparison data $Q_{20}$. Thus, in the comparison register 20, the latest resulting data $Q_{19}$ is always stored (except in the cases where a data error was caused by a power failure or noise).

The delay processing is conducted in the write delay circuit 17 in order to prevent not the updated resulting data $Q_{19}$ but the not-yet-updated resulting data $Q_{19}$ from being held in the comparison register 20 as the comparison data $Q_{20}$ when a signal of high-level '1' is output to the comparison register 20 as soon as a signal of high-level '1' is received from the OR circuit 16.

To the comparator 21, the comparison data $Q_{20}$ output from the comparison register 20 and the resulting data $Q_{19}$ are input. The comparator 21 compares the comparison data $Q_{20}$ with the resulting data $Q_{19}$. When the comparison result is true (here, when the both are the same), comparison result data $Q_{21}$ of low-level '0' (an error flag) is output. On the other hand, when the comparison result is false, the comparison result data $Q_{21}$ of high-level '1' is output.

As described above, in the comparison register 20, the latest resulting data $Q_{19}$ is always stored. Therefore, in a normal operating condition, the comparison data $Q_{20}$ and the resulting data $Q_{19}$ are inevitably the same, and from the comparator 21, the comparison result data $Q_{21}$ of low-level '0' is output.

On the other hand, when at least one of the data $Q_{12}$-$Q_{14}$ held in the registers 12-14 is changed by a power failure or noise, the resulting data $Q_{19}$ is influenced by that and is changed. However, in this case, since the write permission signals $W_{12}$-$W_{14}$ are not a high level of '1', the write permission signal $W_{20}$ of high-level '1' is not input to the comparison register 20 and the comparison data $Q_{20}$ is not updated. As a result, a difference is caused between the comparison data $Q_{20}$ and the resulting data $Q_{19}$, leading to an output of the comparison result data $Q_{21}$ of high-level '1' from the comparator 21.

Moreover, to the registers 12-14 and the comparison register 20, a reset signal is input. When receiving the reset signal, the registers 12-14 and the comparison register 20 perform reset processing. Therefore, for example, when an occurrence of a data error was detected, the registers 12-14 and the comparison register 20 are returned to their initial states by providing the reset signal to the registers 12-14 and the comparison register 20. And then, by making at least one of the write permission signals $W_{12}$-$W_{14}$ a high level of '1' so as to produce the write permission signal $W_{20}$, the value in the comparison register 20 can be made normal and the comparison result data $Q_{21}$ (error flag) can be made '0'. The reason why such write processing is conducted is because for normal initialization, the write processing is required at least once after reset since the reset signal often gets noise.

When the error detecting device according to the first embodiment is used, the comparison data $Q_{20}$ held in the comparison register 20 and the resulting data $Q_{19}$ are the same during normal operation of the registers 12-14. However, when at least one of the data $Q_{12}$-$Q_{14}$ held in the registers 12-14 is changed by a power failure or noise, a difference is caused between the comparison data $Q_{20}$ held in the comparison register 20 and the resulting data $Q_{19}$. As a result, by comparing the comparison data $Q_{20}$ with the resulting data $Q_{19}$, the occurrence of a data error in the registers 12-14 can be detected.

Here, concerning the error detecting device according to the first embodiment, a case where there are three registers to be examined has been described. But the error detecting device according to the present invention is not limited to the case of three registers to be examined, and it is needles to say that two registers or four or more registers can be arranged.

In addition, the registers to be examined had better be scattered on an integrated circuit (e.g. an LSI). If the registers to be examined are scattered on the integrated circuit, it is possible to detect an occurrence of a data error caused by a power failure or noise across the integrated circuit. It is far better if the registers to be examined are evenly spaced on the integrated circuit. Furthermore, in an error detecting device according to another embodiment, registers which are placed where a power failure or noise is particularly likely to occur may be preferentially examined.

Figure 2:
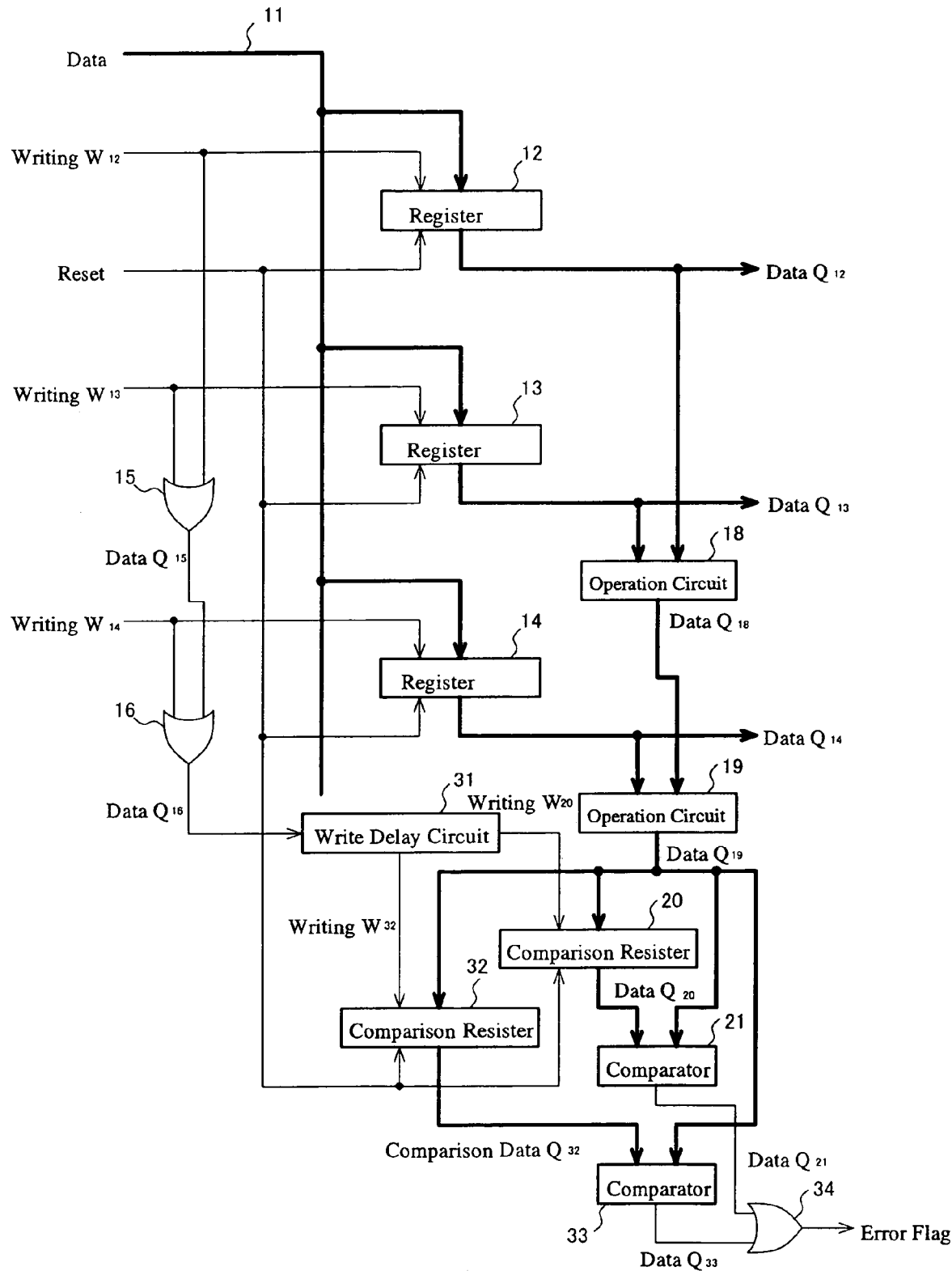
FIG. 2 is a block diagram schematically showing the principal part of an error detecting device according to a second embodiment.

FIG. 2 is a block diagram schematically showing the principal part of an error detecting device according to a second embodiment (or a device in which an error detection method according to the second embodiment is adopted). Here, the same components as those of the error detecting device shown in FIG. 1 are similarly marked. Reference numeral 31 in FIG. 2 represents a write delay circuit, to which resulting data $Q_{16}$ in an OR circuit 16 for operating and outputting an 'OR' is input. Accordingly, when at least one of write permission signals $W_{12}$-$W_{14}$ is a high level of '1', a signal of high-level '1' is input to the write delay circuit 31.

The registers 12-14 output data $Q_{12}$-$Q_{14}$ held therein to the outside. The data $Q_{12}$ output from the register 12 and the data $Q_{13}$ output from the register 13 are output to an operation circuit 18. Resulting data $Q_{18}$ in the operation circuit 18 and the data $Q_{14}$ output from the register 14 are output to an operation circuit 19. Resulting data $Q_{19}$ in the operation circuit 19 is output to comparison registers 20 and 32 for holding comparison data and to comparators 21 and 33.

To the comparison register 20, a write permission signal $W_{20}$ for permitting the writing of the resulting data $Q_{19}$ output from the operation circuit 19 is input from the write delay circuit 31. When the write permission signal $W_{20}$ becomes a high level of '1', the resulting data $Q_{19}$ is held in the comparison register 20. And from the comparison register 20, comparison data $Q_{20}$ held therein is output to the comparator 21.

And to the comparison register 32, a write permission signal $W_{32}$ for permitting the writing of the resulting data $Q_{19}$ output from the operation circuit 19 is input from the write delay circuit 31. When the write permission signal $W_{32}$ becomes a high level of '1', the resulting data $Q_{19}$ is held in the comparison register 32. And from the comparison register 32, comparison data $Q_{32}$ held therein is output to the comparator 33. Here, as described in more detail below, the timing of writing the resulting data $Q_{19}$ is different between the comparison registers 20 and 32.

After receiving a signal of high-level '1' from the OR circuit 16, the write delay circuit 31 outputs the write permission signal $W_{20}$ of high-level '1' to the comparison register 20 with one clock delay and outputs the write permission signal $W_{32}$ of high-level '1' to the comparison register 32 with another one clock delay. As described above, when at least one of the write permission signals $W_{12}$-$W_{14}$ is a high level of '1', a signal of high-level '1' is input to the write delay circuit 31.

As a result, when the writing of data into any one of the registers 12-14 is conducted (i.e. the resulting data $Q_{19}$ to be obtained through the operations in the operation circuits 18 and 19 is changed), a signal of high-level '1' is output to the comparison register 20 (32) and the updated resulting data $Q_{19}$ is held in the comparison register 20 (32). Thus, in the comparison register 20 (32), the latest resulting data $Q_{19}$ is always stored (except in the cases where a data error was caused by a power failure or noise).

Here, the delay processing is conducted in the write delay circuit 31 in order to prevent not the updated resulting data $Q_{19}$ but the resulting data $Q_{19}$ not yet updated from being held as the comparison data $Q_{20}$ ($Q_{32}$) in the comparison register 20 (32) when a signal of high-level '1' is output to the comparison register 20 (32) as soon as a signal of high-level '1' is received from the OR circuit 16.

To the comparator 21 (33), the comparison data $Q_{20}$ ($Q_{32}$) output from the comparison register 20 (32) and the resulting data $Q_{19}$ are input. The comparator 21 (33) compares the comparison data $Q_{20}$ ($Q_{32}$) with the resulting data $Q_{19}$. When the comparison result is true (here, when the both are the same), comparison result data $Q_{21}$ ($Q_{33}$) of low-level '0' is output, while the comparison result data $Q_{21}$ ($Q_{33}$) of high-level '1' is output when the comparison result is false.

As described above, the latest resulting data $Q_{19}$ is always stored in the comparison register 20 (32). Therefore, in a normal operating condition, the comparison data $Q_{20}$ ($Q_{32}$) and the resulting data $Q_{19}$ are inevitably the same, and the comparison result data $Q_{21}$ ($Q_{33}$) of low-level '0' is output from the comparator 21 (33).

On the other hand, if at least one of the data $Q_{12}$-$Q_{14}$ held in the registers 12-14 is changed by a power failure or noise, the resulting data $Q_{19}$ is influenced by that and is changed. However, in this case, since the write permission signals $W_{12}$-$W_{14}$ are not a high level of '1', the write permission signal $W_{20}$ ($W_{32}$) of high-level '1' is not input to the comparison register 20 (32) and the comparison data $Q_{20}$ ($Q_{32}$) is not updated.

As a result, a difference is caused between the comparison data $Q_{20}$ ($Q_{32}$) and the resulting data $Q_{19}$, and from the comparator 21 (33), the comparison result data $Q_{21}$ ($Q_{33}$) of high-level '1' is output.

The comparison result data $Q_{21}$ from the comparator 21 and the comparison result data $Q_{33}$ from the comparator 33 are output to an OR circuit 34 for operating and outputting an 'OR', and resulting data in the OR circuit 34 is output as an error flag. An output signal from the OR circuit 34 becomes a high level of '1' when at least one of the input signals thereto is a high level of '1'.

To the registers 12-14 and the comparison registers 20 and 32, a reset signal is input. When the registers 12-14 and the comparison registers 20 and 32 receive the reset signal, reset processing is conducted. Therefore, for example, when an occurrence of a data error was detected, by providing the reset signal to the registers 12-14 and the comparison registers 20 and 32, and conducting the write processing at least once, the registers 12-14 and the comparison registers 20 and 32 can be returned to their normal initial states.

When the error detecting device according to the second embodiment is used, during normal operation of the registers 12-14, the comparison data $Q_{20}$ ($Q_{32}$) held in the comparison register 20 (32) and the resulting data $Q_{19}$ are the same. However, when at least one of the data $Q_{12}$-$Q_{14}$ held in the registers 12-14 is changed by a power failure or noise, a difference is caused between the comparison data $Q_{20}$ ($Q_{32}$) held in the comparison register 20 (32) and the resulting data $Q_{19}$. As a result, by comparing the comparison data $Q_{20}$ ($Q_{32}$) with the resulting data $Q_{19}$, the occurrence of a data error in the registers 12-14 can be detected.

By the way, when a data error is caused by a power failure or noise at about the same time as the normal timing of writing, there is a possibility that wrong data may be written into the comparison register and that the comparison data may be wrong data. However, plural comparison registers, the comparison registers 20 and 32, are arranged, and the writing of data is conducted with different timing from each other. Therefore, even if wrong data was written into either of the comparison registers 20 and 32, there is a comparison register into which correct data was written. As a result, the occurrence of a data error can be detected.

Here, concerning the error detecting device according to the second embodiment, the case where two comparison registers 20 and 32 are arranged as resisters for comparison has been described above, but in the error detecting device according to the present invention, the number of comparison registers is not limited to two. Three or more comparison registers can be arranged.

Figure 3:
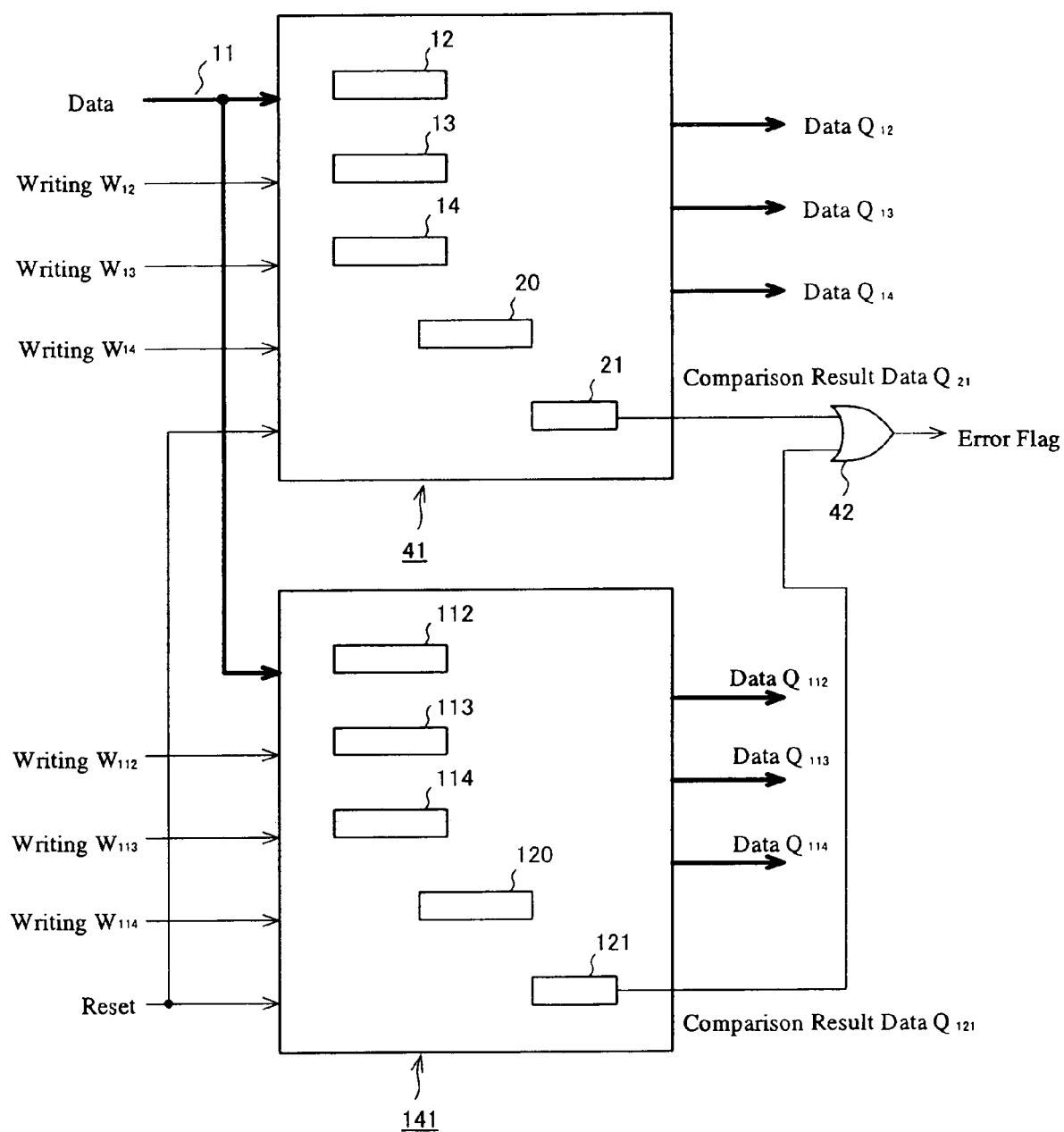
FIG. 3 is a block diagram schematically showing the principal part of an error detecting device according to a third embodiment.

FIG. 3 is a block diagram schematically showing the principal part of an error detecting device according to a third embodiment (or a device in which an error detection method according to the third embodiment is adopted). Reference numeral 41 in FIG. 3 represents an error detecting circuit, to which a data bus 11 is connected, and write permission signals $W_{12}$-$W_{14}$ and a reset signal are input. Here, the error detecting circuit 41 has the same construction as the error detecting device shown in FIG. 1. Data $Q_{12}$-$Q_{14}$ held in registers 12-14 and comparison result data $Q_{21}$ showing a comparison result in a comparator 21 are output to the outside.

An error detecting circuit 141 has the same construction as the error detecting circuit 41, comprising registers 112-114, OR circuits (not shown), a write delay circuit (not shown), operation circuits (not shown), a comparison register 120 and a comparator 121. To the error detecting circuit 141, the data bus 11 is connected similarly to the error detecting circuit 41, and write permission signals $W_{112}$-$W_{114}$ for permitting the writing of data into the registers 112-114 and a reset signal are input. And data $Q_{112}$-$Q_{114}$ held in the registers 112-114 and comparison result data $Q_{121}$ showing a comparison result in a comparator 121 are output to the outside.

The comparison result data $Q_{21}$ from the error detecting circuit 41 (comparator 21) and the comparison result data $Q_{121}$ from the error detecting circuit 141 (comparator 121) are output to an OR circuit 42 for operating and outputting an 'OR', and resulting data in the OR circuit 42 is output as an error flag. The output signal from the OR circuit 42 becomes a high level of '1' when at least one of the input signals thereto is a high level of '1'.

When the error detecting device according to the third embodiment is used, the occurrence of a data error can be detected in each of the error detecting circuits 41 and 141. Therefore, when garbling of data occurs in the registers 112-114 though there is no garbled data in the registers 12-14, the occurrence of a data error can be detected in the error detecting circuit 141. Conversely, when garbling of data occurs in the registers 12-14 though there is no garbled data in the registers 112-114, the occurrence of a data error can be detected in the error detecting circuit 41. As a result, the occurrence of a data error can be more certainly detected.

Moreover, there are plural comparison registers, comparison registers 20 and 120. Therefore, even if wrong data was written into either of the comparison registers 20 and 120, there is a comparison register into which correct data was written, resulting in detection of the occurrence of a data error.

Here, concerning the error detecting device according to the third embodiment, the case wherein two error detecting circuits 41 and 141 are arranged as error detecting circuits has been described above, but in the error detecting device according to the present invention, the number of error detecting circuits is not limited to two. Three or more error detecting circuits can be arranged.

Figure 4:
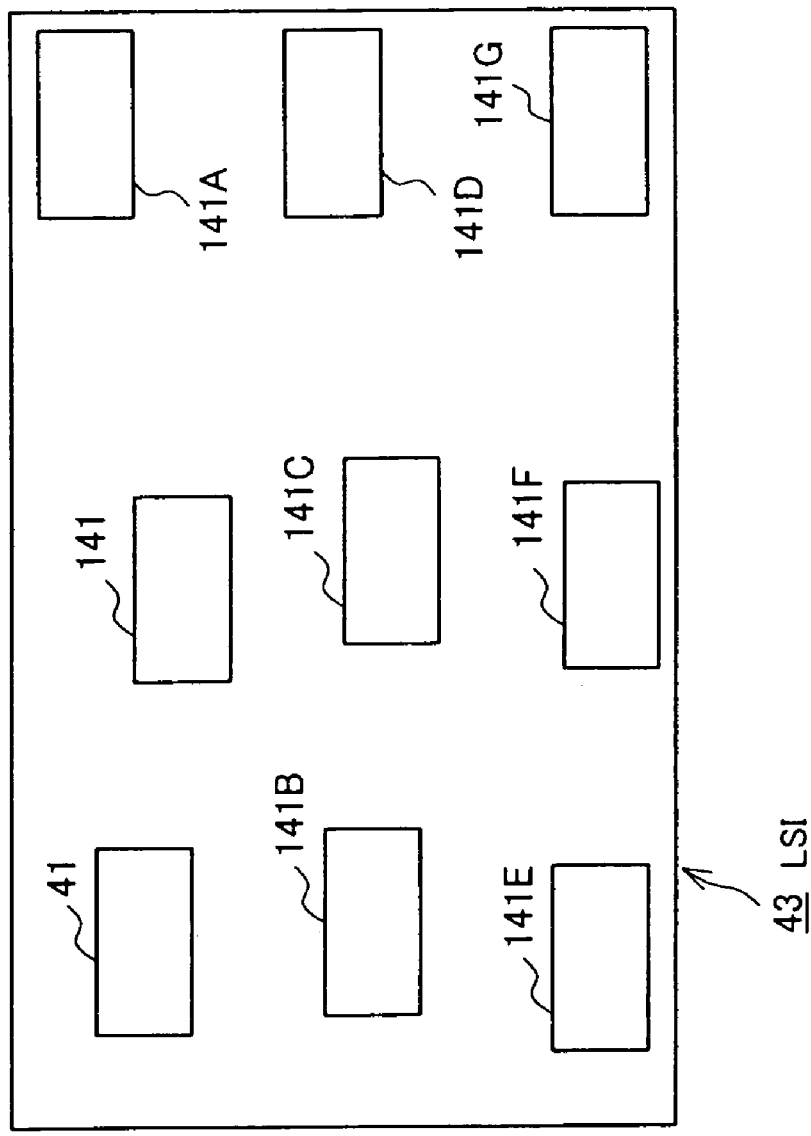
FIG. 4 is an illustration of an error detecting device according to another embodiment.

Moreover, each error detecting circuit had better be scattered on an integrated circuit (e.g. an LSI). For example, when error detecting circuits 41, 141 and 141A-141G are scattered on an LSI 43 as shown in FIG. 4, an occurrence of a data error caused by a power failure or noise can be detected across the LSI 43. It is far better if the error detecting circuits are evenly spaced across the integrated circuit. In an error detecting device according to another embodiment, error detecting circuits may be preferentially arranged where a power failure or noise is likely to occur.

In addition, by dividing the registers 12-14 and 112-114 to be examined into groups based on their locations (i.e. grouping closer registers), the length of interconnections for connecting each circuit can be shortened, resulting in a simple circuit configuration.

In the error detecting devices according to the first to third embodiments, as shown in FIGS. 1 and 2, the data $Q_{12}$-$Q_{14}$ output from the registers 12-14 are operated in the operation circuits 18 and 19, and the resulting data $Q_{19}$ is output to the comparison register 20 and the comparator 21. But in an error detecting device according to another embodiment, the number of operation circuits may be reduced. A prescribed operation may be performed on data $Q_{12}$-$Q_{14}$ in one operation circuit, and so the resulting data $Q_{19}$, is output to a comparison register 20 and a comparator 21.

When the prescribed operation is performed, it is desirable that a relation between the data $Q_{12}$-$Q_{14}$ and the resulting data $Q_{19}$, that if at least one value of the data $Q_{12}$-$Q_{14}$ is changed, the value of the resulting data $Q_{19}$, changes together should be satisfied.

When this relation is satisfied, the resulting data $Q_{19}$ changes, regardless of whether the values of the data $Q_{12}$-$Q_{14}$ are changed by normal writing or by a data error.

As an operation which satisfies such relation, for example, an exclusive-OR operation is performed on any two values of the data $Q_{12}$-$Q_{14}$ at every bit and an exclusive-OR operation on a result of the operation and the remaining one value is performed at every bit. As a concrete circuit configuration, a circuit configuration including an exclusive-OR operation circuit is exemplified.

This is just one example, and if it is an operation satisfying the above-described relation, other operation methods or other circuit configurations can be adopted. As the other circuit configurations, logical circuits such as AND, OR, NOT, NAND, NMOSNAND, CMOSNAND, NOR and NMOSNOR, arithmetic circuits such as XOR, HALFADDER, FULLADDER, ADDER, SUB, MULTIPLIER, HALFADDERfordivid, FULLADDERfordivid and DIVIDER, and other function operation processing are exemplified. A combination of them can also be adopted.

Here, in the case of the prescribed operation being performed, it is desirable that the above-described relation be satisfied, but 100% satisfaction is not needed. For example, in the case of a hash function being adopted as the prescribed operation, there may be a case where the resulting data $Q_{19}$, does not change together with the change of the data $Q_{12}$-$Q_{14}$. But if the probability of such case is slight, the object of the present invention to detect garbled data in a register with high accuracy is achieved.

Concerning the error detecting devices according to the above-described embodiments, as shown in FIGS. 1 and 2, the case where there are three registers to be examined has been described. But the number of registers to be examined is not limited to three. In another embodiment, a construction for detecting garbled data in two registers or four or more registers may be adopted.

EXAMPLE 1

Figure 5:
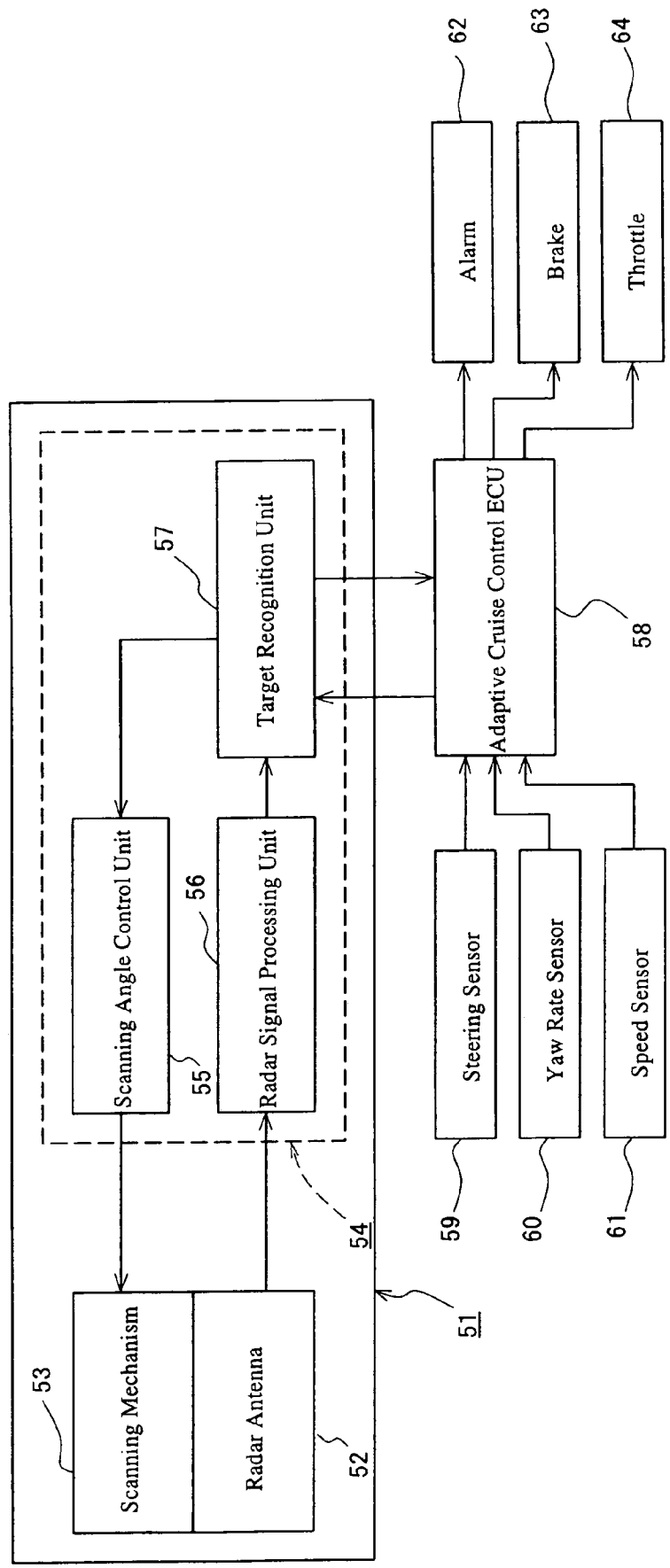
FIG. 5 is a block diagram schematically showing the principal part of an adaptive cruise control system in which an error detecting device or an error detection method according to a first example is adopted.
Figure 6:
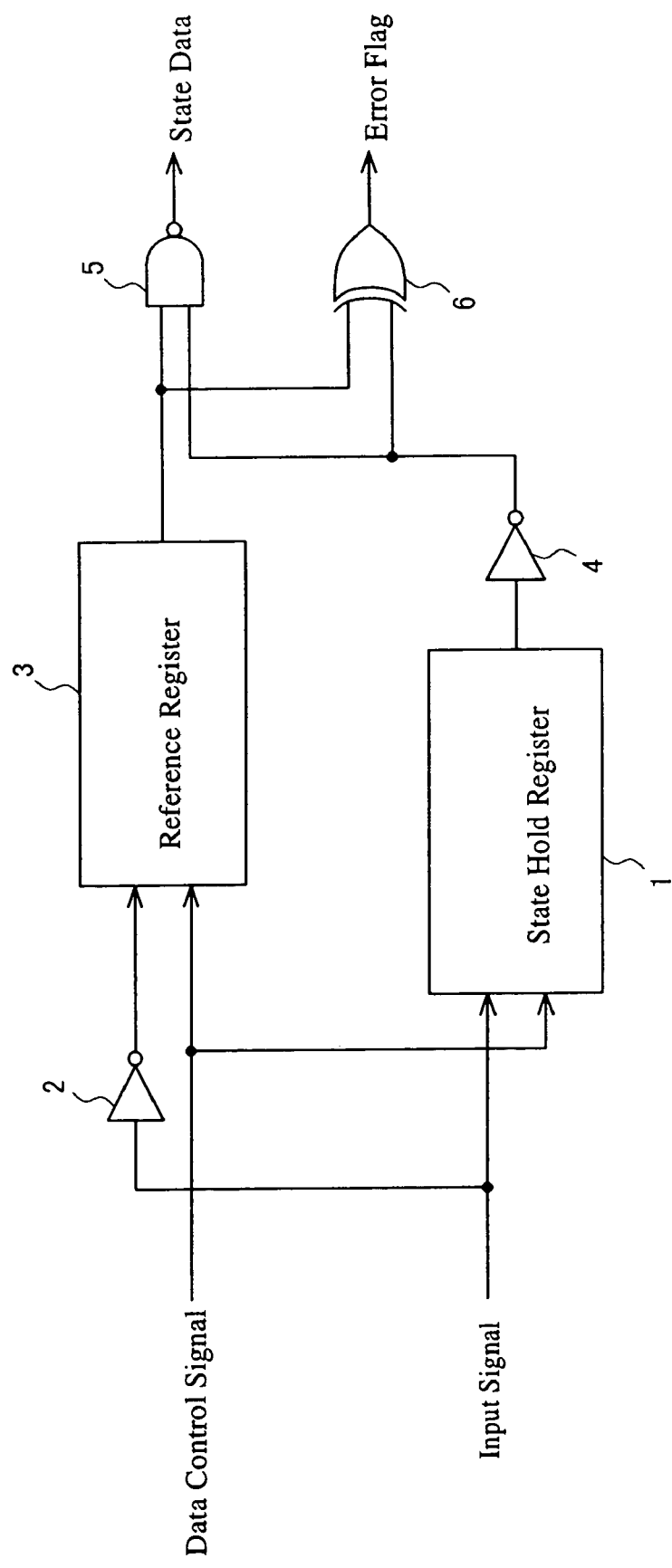
FIG. 6 is a block diagram schematically showing the principal part of a conventional error detecting device.

FIG. 5 is a block diagram schematically showing the principal part of an adaptive cruise control system (equivalent to a control system according to the present invention) where an error detecting device or an error detection method according to Example 1 is adopted. Reference numeral 51 in FIG. 5 represents a radar sensor unit, comprising a radar antenna 52, a scanning mechanism 53 and a signal processing circuit 54. As the radar sensor unit 51, a millimeter wave radar is exemplified.

The signal processing circuit 54 comprises a scanning angle control unit 55, a radar signal processing unit 56 and a target recognition unit 57. The radar signal processing unit 56 performs FET processing on a reflection signal from the radar antenna 52, detects a power spectrum, calculates a distance from a target (a vehicle ahead) and a relative speed, and sends data showing the distance from the target and the relative speed to the target recognition unit 57.

An adaptive cruise control ECU (electronic control unit) 58 controls an alarm 62, a brake 63, a throttle 64 and associated parts when receiving signals from a steering sensor 59, a yaw rate sensor 60, a speed sensor 61 and the target recognition unit 57.

The target recognition unit 57 provides a scanning angle to the scanning angle control unit 55 and decides a target to be used for the control based on the distance from the target and the relative speed received from the radar signal processing unit 56, and vehicle information such as a steering angle, a yaw rate and a speed received from the adaptive cruise control ECU 58, and sends information about the target to the adaptive cruise control ECU 58.

In the case of a radar of a fixed type, the scanning angle control unit 55 controls the scanning angle in driving on curves, while it controls the range of scanning in the case of a radar of a scanning type. The scanning mechanism 53 sequentially launches beams at given angles for scanning when receiving a control signal from the scanning angle control unit 55.

In the radar signal processing unit 56, the target recognition unit 57 and the adaptive cruise control ECU 58, the error detecting device or the error detection method according to the present invention is adopted. Therefore, data errors in registers (storage circuits for temporarily storing data) on ICs such as microcomputers used in the radar signal processing unit 56, the target recognition unit 57 and the adaptive cruise control ECU 58 can be detected.

What is claimed is:

1. An error detecting device for detecting an occurrence of a data error in a register for holding input data with reception of a write permission, the error detecting device comprising:
    an operation unit for performing a prescribed operation with each data output from a plurality of registers to be examined;
    a memory for storing data for comparison;
    a write unit for writing data obtained by the operation unit into the memory in accordance with the timing of the write permission; and
    a comparison unit for comparing the data for comparison stored in the memory with the data obtained by the operation unit.

2. An error detecting device according to claim 1, wherein the operation unit performs a logical operation.

3. An error detecting device according to claim 1, wherein the operation unit performs an arithmetic operation.

4. An error detecting device according to claim 1, wherein the write unit writes the data obtained by the operation unit into the memory with a predetermined time delay after the timing of the write permission.

5. An error detecting device according to claim 1, wherein the registers are scattered on an integrated circuit.

6. An error detecting device according to claim 1,
    wherein the memory is one of a plurality of memories, and
    wherein the data obtained by the operation unit is written into each of the plurality of memories.

7. An error detecting device according to claim 1,
    wherein the memory is one of a plurality of memories,
    wherein the registers to be examined are divided into groups,
    wherein the operation unit is one of a plurality of operation units,
    wherein a respective one of the operation units is arranged in each of the groups, and
    wherein data obtained by each of the operation units is separately written into each of the memories.

8. An error detecting device according to claim 7, wherein the registers are scattered on an integrated circuit and are divided into groups based on locations of the registers.

9. An error detection method for detecting an occurrence of a data error in a register for holding input data with reception of a write permission, the error detection method comprising:
    a step of performing a prescribed operation with each data output from a plurality of registers to be examined;
    a step of writing data obtained through the operation into a memory for storing data for comparison in accordance with the timing of the write permission; and
    a step of comparing the data for comparison stored in the memory with the data obtained through the operation.

10. A control system in which the error detecting device according to claim 1 is utilized,
    wherein the plurality of registers hold data obtained from a millimeter wave radar, and
    wherein the control system comprises a control unit for conducting control based on the data held in the registers.

11. A control system in which the error detection method according to claim 9 is performed,
    wherein the plurality of registers hold data obtained from a millimeter wave radar, and
    wherein the control system comprises a control unit for conducting control based on the data held in the registers.

* * * * *